United States Patent [19]

Doss et al.

[11] 4,151,344
[45] Apr. 24, 1979

[54] RELEASE SUBSTRATE

[75] Inventors: Richard C. Doss; Robert E. Reusser, both of Bartlesville, Okla.

[73] Assignee: Phillips Petroleum Company, Bartlesville, Okla.

[21] Appl. No.: 865,830

[22] Filed: Dec. 29, 1977

[51] Int. Cl.$^2$ ............................................. C08G 47/00
[52] U.S. Cl. ....................................... 528/34; 528/14; 528/17; 528/18; 528/33; 528/31; 428/352; 428/447; 427/387
[58] Field of Search .................. 428/352, 447; 528/17, 528/14, 18, 33, 34, 31

[56] References Cited

U.S. PATENT DOCUMENTS

| | | | |
|---|---|---|---|
| 2,732,318 | 1/1956 | Kei | 428/352 |
| 3,151,099 | 9/1964 | Pagni | 260/46.5 G |
| 3,409,573 | 11/1968 | Gluinet | 260/46.5 G |
| 3,518,325 | 6/1970 | Campbell | 260/46.5 G |
| 3,575,917 | 4/1971 | Kapral | 260/46.5 G |
| 3,679,458 | 7/1972 | Sovell | 428/352 |
| 4,018,734 | 3/1977 | Dumoulin | 260/29.1 SB |

*Primary Examiner*—Sam Silverberg

[57] ABSTRACT

A selected polymethyldihydroxysiloxane, a polymethylhydrosiloxane, a tetraalkyl titanate, and a low molecular weight, silicate-derived polymer are compounded to produce a release coating having significantly improved properties. A method for compositing an adhesive-coated material and a protective covering therefor, the covering having thereon a coating of the release composition of the invention as set forth.

5 Claims, No Drawings

RELEASE SUBSTRATE

This invention relates to release substrates or coating. In one of its aspects the invention relates to a composition comprising a silicone-derived compound, e.g., a polymethyldihydroxysiloxane. In another of its aspects the invention relates to a composition comprising a polymethylhydrosiloxane. In a more specific aspect of the invention it relates to such siloxanes composited advantageously with ingredients considerably improving the properties of release compositions or substrates thus obtained.

In one of its concepts the invention provides a composition suitable for use as a release coating or substrate comprising a selected polymethyldihydroxysiloxane having a relatively high molecular weight, a relatively low molecular weight polymethylhydrosiloxane, a low molecular weight silicate-derived polymer and a tetraalkyl titanate. In another of its concepts the invention provides a method for coating such a composition upon a substrate. In a further concept of the invention, it provides a method for effecting such a coating employing a suitable solvent. In a further concept of the invention it provides a composition as herein described, including a catalyst, also as herein described.

In another of its concepts the invention provides, in one embodiment thereof, a pressure sensitive adhesive coated substrate, the adhesive being protected by the cover or coating which is itself coated with a composition according to the present invention.

A good release coating is characterized by its ability to retain a desired release strength as well as ready release ability even after rubbing with another material. Obviously, the application of protective coatings, which do not have a release substance which can be touched or rubbed by another material without loosing its effectiveness, are not really desired ordinarily. Further, a release coating should have a strength sufficient to adhere to the substrate on to which it is coated and little or no tendency to transfer therefrom to the adhesive which, of course, would reduce the strength of the adhesive.

I have now discovered certain compositions which permit considerably less total additives to be used in compounded selected siloxanes, herein described. Further, I have discovered that with use of both a silicate-derived polymer and a tetralkyl titanate, not only are increased release force or release strengths obtained, which are retained even after aging, but that the amount of silicate-derived polymer can be considerably reduced. Further, I have discovered that relatively speaking very minor quantities of tetralkyl titanate will, in a composition described, be effective to multiply the release force property obtained upon use of silicate-derived polymer alone. Still further, I have discovered that by increasing the amount of tetralkyl titanate, without however necessarily even approaching or exceeding for the total (titanate plus silicate-derived polymer) thereof, the amount of silicate-derived polymer heretofore needed for certain release forces to be obtained, that increased release forces than heretofore obtained can be reached.

It is an object of this invention to produce a release coating or substrate. It is another object of this invention to produce a composition containing a selected siloxane together with other ingredients the latter being so chosen as to reduce the total amount of additives needed to produce a considerably better release coating or substrate. A still further object of the invention is to provide a method for producing a release coating comprising a selected siloxane and a low molecular weight silicate-derived polymer together with other ingredients considerably ameliorating the release coating properties of such compositions. A further object of the invention is to provide a method of compositing an adhesive coated substrate together with a protective coating for said adhesive.

Other aspects, concepts, objects and the several advantages of the invention are apparent from a study of this disclosure and the appended claims.

According to the present invention the now preferred composition is prepared by bringing together the following ingredients in a suitable manner: a selected polymethyldihydroxysiloxane having a relatively high molecular weight, a relatively low molecular weight polymethylhydrosiloxane, a low molecular weight silicate-derived polymer and a tetralkyl titanate, each of the said ingredients being selected from herein after defined groups. Presently, a catalyst to affect a more desirable rate of reaction is also included in the composition.

The disclosure of the following U.S. Patents are incorporated herein by reference as reflecting some of the prior art. U.S. Pat. Nos. 3,518,325—June 30, 1970 James K. Campbell and Lawrence C. Sprenger; 3,575,917—Apr. 20, 1971 Ales Kapral; 3,679,458—July 25, 1972 H. P. Sorell, E. Pomazak and S. Rygg; 3,936,582—Feb. 3, 1976 LeRoy H. Keiser, and 4,018,734—Apr. 19, 1977 Jean Dumoulin.

According to the present invention the now preferred composition is prepared by bringing together the following ingredients in a suitable manner and with the aid of a suitable solvent: a polymethyldihydroxysiloxane, as later defined, a polymethylhydrosiloxane, as later defined, a silicate-derived polymer, as later defined, and a tetralkyl titanate in the presence of a suitable catalyst followed by curing as by evaporating the solvent and subjecting the composition as coated on a substrate to a temperature in the range from about 65° C. to about 125° C. for a short period of time, e.g., generally less than about 1 minute. The total amount of heat and the temperature at which it is applied will, of course, be gaged to prevent undue injury to the substrate on which such composition may have been coated.

U.S. Pat. No. 3,575,917, the disclosure of which has been incorporated by reference, discloses a great many different organopolysiloxanes which are known in the art. Column 2 lines 45 et seq., of the patent.

Of the materials described in the patent, the now preferred ingredients included in the invention are now further defined.

Generally, the high molecular weight polymethyldihydroxysiloxanes useful in the invention can be described as being any hydroxyl end blocked dimethylpolysiloxane having a viscosity of at least 2000 cs. at 25° C. These polysiloxanes, as such, can vary from viscous fluids to non-flowing gums. As used in the compounding of the invention these materials are preferably used in a suitable solvent for ease of compounding.

The polymethyldihydroxysiloxanes most especially noted as being useful in this invention are substantially linear dimethylsiloxane polymers in which the terminal silicon atoms of the polymer molecules have directly attached thereto hydroxyl radicals. Such polymers are generally represented by the general formula HO[-Si(CH$_3$)$_2$O]$_n$H wherein n represents the number of repeating units in the polymer chain and is generally in the range of 1,000 to 5,000. Thus the polymer molecules generally contain an average of about 2 hydroxyl groups per molecule located at the terminal thereof.

Continuing, also generally, the low molecular weight polymethylhydrosiloxanes useful in the invention can have a linear, cyclic or branched configuration and can be either a homopolymer or a copolymer. In any event, the percent by weight of

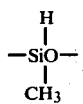

should be from about 1 to about 10 percent, preferably from about 1 to about 5 percent based on the weight of polymethyldihydroxysiloxane.

Examples of such compounds are

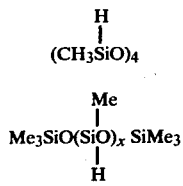

wherein x is an integer in the range 3–50;

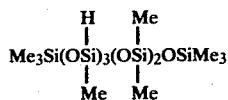

and mixtures thereof.

The polymethylhydrosiloxanes useful in this invention are substantially linear siloxane polymers in which some of the silicon atoms have hydrogen atoms bonded thereto, the remaining valences of the silicon atoms being satisfied with methyl radicals or with oxygen atoms forming the —OSiOSiOSi— linkages within the siloxane chain. Thus the operable polymethylhydrosiloxanes are represented by the general formula (CH$_3$)$_3$SiO[SiR(CH$_3$)—O]$_m$Si(CH$_3$)$_3$ wherein R is hydrogen or a methyl radical, m refers to the number of repeating units in the polymer chain and is generally in the range of 25 to 100, with the further proviso that at least 25 percent of the R groups are hydrogen and preferably from 50 to 100 percent of the R groups are hydrogen with the remainder thereof being methyl radicals.

The silicate-derived polymers useful in this invention are obtained by hydrolysis and trimethylsilylation of alkali metal silicates or tetraalkyl silicates.

A preferred method of preparation of the silicate-derived polymer involves the hydrolysis of sodium silicate with aqueous acid, for example, hydrochloric acid, and subsequent treatment of the hydrolyzed silicate with trimethylchlorosilane to give a hydrophobic polymer which generally contains less than 2 weight percent hydroxyl groups based upon the total weight of the trimethylsilylated polymer.

An alternate method of preparing the silicate-derived polymer involves the co-hydrolysis of trimethylchlorosilane and a tetraalkyl silicate of formula (R'O)$_4$Si wherein the R's are independently selected from alkyl radicals of 1–6 carbon atoms per radical. When co-hydrolyzing trimethylchlorosilane with a tetraalkyl silicate, it is necessary to add a small amount of acid such as hydrochloric acid to effect hydrolysis and inter-condensation or co-condensation. The amount of trimethylchlorosilane employed in the co-hydrolysis will vary from substantially less than the stoichiometric amount to slightly less than the stoichiometric amount depending upon the amount of hydroxyl groups desired in the resultant polymer.

The co-hydrolysis of trimethylchlorosilane and tetraalkyl silicate is relatively simple and merely requires addition of the trimethylchlorosilane and tetraalkyl silicate to a suitable solvent, such as toluene, benzene, xylene, etc., and thereafter addition of the solution of the ingredients to a sufficient amount of aqueous acid to effect the desired hydrolysis and co-condensation. The amount of water employed for hydrolysis purposes is generally not critical and may be varied within wide ranges.

For the release coatings of the present invention it is generally preferable to employ silicate-derived polymers in a molecular weight range of 3,000 to 10,000, and preferably 4,000 to 6,000.

The tetraalkyl titanates generally useful in the release coatings of this invention are those generally corresponding to the formula (R"O)$_4$Ti wherein the R' groups can be the same or different and are generally alkyl radicals containing from 1 to 12 and preferably 1 to 4 carbon atoms per group. Examples of suitable tetraalkyl titanates include tetramethyl titanate, tetraethyl titanate, tetraisopropyl titanate, tetra-n-butyl titanate, tetraoctyl titanate, tetradecyl titanate, tetradodecyl titanate, and the like.

The catalysts useful in the preparation of the inventive release coatings are generally metal salts of carboxylic acids. Examples of metals which may be used are lead, tin, nickel, cobalt, iron, cadmium, chromium, zinc and the like. The tin salts are generally preferred. Examples of suitable catalysts are dibutyltin diacetate, dibutyltin dilaurate, dibutyltin di-(2-ethylhexanoate), dioctyltin diacetate, tributyltin acetate, dioctyltin maleate, cobalt naphthenate, chromium octanoate, and the like. Dibutyltin diacetate is a preferred catalyst for the inventive release coating.

Various organic solvents may be utilized as the liquid medium for applying the inventive release coatings to the desired substrates. Examples of these solvents are aliphatic hydrocarbons such as pentane, neopentane, hexane, octane; cycloaliphatic hydrocarbons such as cyclohexane, cycloheptane; aromatic hydrocarbons such as benzene, toluene, xylene; ethers such as diethyl ether, dibutyl ether, amyl ether; and halogenated hydrocarbons such as carbon tetrachloride, chloroform, and dichloromethane. Such solvents can be employed either alone or in any suitable combination thereof.

The release coatings of this invention to be applied to the desired substrate are generally formulated according to the proportions given in the following recipe:

| Ingredients | Recipe Broad Range | Preferred Range |
|---|---|---|
| Polymethyldihydroxysiloxane | 3 | 3 |
| Polymethylhydrosiloxane | .03–0.3 | .06–.15 |
| Silicate-derived polymer | .1–.5 | .2–.3 |
| Tetraalkyl titanate | .05–2 | .3–.7 |
| Catalysts | .01–.6 | .1–.5 |

| Ingredients | Recipe Broad Range | Preferred Range |
|---|---|---|
| Solvent | 20–200 | 50–80 |

The above-described ingredients may be combined in any suitable manner, such as adding the polymers, tetraalkyl titanate and catalysts to the solvent, followed by sufficient agitation to homogenize the blend.

The compositions of this invention are particularly useful as release coatings for paper and other sheet materials. Examples of suitable substrates include glassine, vegetable parchment, kraft paper, metal foils, plastic films, such as cellophane, polyethylene, polypropylene, vinyl resins, acrylic resins, polyamide resins, and polyester resins. A preferred substrate is corona-treated polyethylene-coated paper.

While release coatings according to this invention applied to the above-described substrates prevent the sticking of practically any sticky material such as tar, asphalt, raw rubber, and the like, this invention is particularly suitable for use with pressure sensitive adhesives such as those based upon natural or synthetic rubbers including styrene-butadiene rubber, ethylene-vinyl acetate copolymers, polyacrylates, and the like.

The coating compositions of this invention can be applied to suitable substrates by any conventional coating methods. Such methods include spraying, brushing, rolling, and the like.

The amount of coating composition (excluding solvent) applied to paper or other sheet materials is usually in the range from 0.1 to 1 pound (45 to 454 gm) per ream of paper (3,000 ft$^2$ or 280 m$^2$) coated on one side. It is within the scope of this invention, if desired, to coat the substrates on both sides with the inventive coating.

The coating formulations of this invention after being applied to suitable substrates are cured by evaporating the solvent and subjecting the coated substrate to a temperature in the range of 65° C. to 125° C. for a period of time generally less than 1 minute. Of course, the substrate will frequently dictate the temperature employed, for example, lower temperatures will generally be employed with plastic films in order to prevent melting the films.

The information given herein is based in part on disclosures available in the prior art and on work actually done.

The information given herein on the preparation, composition and properties of the low molecular weight silicate-derived polymers was derived commercially.

The following inventive and comparative runs demonstrate the preparation of release paper for use with adhesive tape. Release coatings were applied to corona discharge-treated polyethylene-coated paper to give the desired release paper.

To prepare the inventive and comparative release coatings a commercially available mixture of 97 weight percent high molecular weight polymethyldihydroxysiloxane and 3 weight percent low molecular weight polymethylhydrosiloxane (Syl-Off ™ 23 from Dow Corning Corp.—Solution containing 30% solids) and a commercially available catalyst-dibutyltin diacetate (Syl-Off 23A from Dow Corning Corp.) were used. The inventive coatings also contained a low molecular weight silicate-derived polymer (C4-2109 from Dow Corning Corp.—solution containing 10% solids) and tetraisopropyl titanate in various proportions. The comparative release coatings contained either low molecular weight silicate-derived polymer or tetraisopropyl titanate or alternatively neither additive.

The coatings were prepared by dissolving the desired ingredients (except catalysts) in n-octane as solvent. Catalyst was added just prior to application to paper. The solution (5–10 ml) was evenly distributed over a 22 cm × 28 cm piece of corona-treated polyethylene-coated paper to provide an application rate of about 90 gm per ream (280 m$^2$) of paper. The coated sheets were dried in air at 88° C. for 30 seconds, then allowed to stand 24 hours in air at room temperature prior to testing.

Properties of the release coatings were measured in accordance with procedure RC-283 of the Technical Association of the Pulp and Paper Industry (TAPPI). "Release force" is the ease (gm/inch of width) with which an adhesive tape is pulled from the coated surface. "Subsequent adhesion" is the ease (gm/inch of width) with which an adhesive tape is pulled from a metal panel when the adhesive tape was previously contacted with the release coating, and, hence, is affected by transfer of the release coating from the paper to the adhesive upon separation thereof. "Subsequent adhesion" is to be compared with the ease of removal from a metal panel of the same adhesive tape which has not contacted the release coating.

In Table 1 are given the proportions of ingredients and test results for coatings based on 10 parts by weight Syl-Off 23 and 0.4 parts by weight Syl-Off 23A. Zonas Surgical Tape (Johnson & Johnson) was employed. (See Table I attached)

The inventive and comparative runs in Table II employed coatings based on 10 parts by weight Syl-Off 23 and 2.5 parts by weight C4-2109 (low molecular weight silicate-derived polymer) with variable amounts of catalyst (dibutyltin diacetate) and tetraisopropyl titanate. Zonas Surgical Tape was employed. (See Table II attached)

In Table III are given results of aging the inventive release coatings of Runs 13 to 18 for 18 weeks at room temperature in air. Zonas Surgical Tape was employed. (See Table III attached)

The data in Tables I and II show that a range of release strengths are available through use of the inventive release coatings. Coatings of higher release strength are available through the practice of this invention than the prior art (or comparative) coatings. The high subsequent adhesion values show that transfer of the inventive coatings from the release paper to the adhesive does occur to a slight extent, but that extent is no greater, and in some cases is significantly less, than is exhibited by the prior art coatings. Likewise, rubbing of the release coating did not appear to affect the inventive coatings to an appreciably different extent than it affected the prior art coatings, as evidenced by the rubbed release force values.

Table I

| Run No. | Silicate Derived Polymer[1] | TIPT[2] | n-Octane[3] | Release Force | Subseq. Adhesion | Control Adhesion[4] | Rubbed Release Force[5] |
|---|---|---|---|---|---|---|---|
| 1 (Comp.) | 2.5 | 0 | 58.3 | 32 | 650 | 730 | 60 |

Table I-continued

| Run No. | | Silicate Derived Polymer[1] | TIPT[2] | n-Octane[3] | Release Force | Subseq. Adhesion | Control Adhesion[4] | Rubbed Release Force[5] |
|---|---|---|---|---|---|---|---|---|
| 2  | ″       | 5.0  | 0    | 61    | 101 | 717 | ″   | 106 |
| 3  | ″       | 6.0  | 0    | 62.3  | 86  | 525 | ″   | 168 |
| 4  | ″       | 8.0  | 0    | 64    | 231 | 463 | ″   | 188 |
| 5  | ″       | 10.0 | 0    | 67    | 260 | 480 | ″   | 236 |
| 6  | ″       | 12.0 | 0    | 69    | 318 | 435 | ″   | 265 |
| 7  | (Comp.) | 0    | 0.1  | 55    | 19  | 395 | 637 | 45  |
| 8  | ″       | 0    | 0.2  | 56    | 90  | 442 | ″   | 222 |
| 9  | ″       | 0    | 0.3  | 57    | 143 | 273 | ″   | 367 |
| 10 | ″       | 0    | 0.4  | 58    | 132 | 398 | ″   | 360 |
| 11 | ″       | 0    | 0.5  | 59    | 143 | 320 | ″   | 393 |
| 12 | (Comp.)[6] | 0 | 0    | 56.7  | 18  | 547 | 633 | —[7] |
| 13 | (Inv.)  | 2.5  | 0.12 | 58.2  | 98  | 470 | 762 | 150 |
| 14 | ″       | 2.5  | 0.18 | 58.8  | 260 | 480 | ″   | 533 |
| 15 | ″       | 2.5  | 0.25 | 59.4  | 313 | 433 | ″   | 607 |
| 16 | ″       | 2.5  | 0.50 | 61.8  | 210 | 550 | ″   | 720 |
| 17 | ″       | 2.5  | 0.70 | 64.0  | 250 | 420 | ″   | 683 |
| 18 | ″       | 2.5  | 1.00 | 66.3  | 93  | 613 | ″   | 657 |
| 19 | (Inv.)  | 2    | 0.5  | 68    | 257 | 547 | 653 | —   |
| 20 | ″       | 4    | 0.9  | 79    | 397 | 590 | ″   | —   |
| 21 | ″       | 6    | 1.3  | 90    | 413 | 527 | ″   | —   |
| 22 | ″       | 8    | 1.8  | 102   | 427 | 537 | ″   | —   |
| 23 | ″       | 10   | 2.2  | 113   | 417 | 430 | ″   | —   |
| 24 | ″       | 10   | 1.1  | 90    | 500 | 500 | ″   | —   |
| 25 | ″       | 4    | 2.2  | 105.9 | 293 | 510 | ″   | —   |
| 26 | ″       | 2    | 2.2  | 103.6 | 290 | 590 | ″   | —   |

[1]C4-2109 (Dow Corning Corp.) Parts by weight of low molecular weight polymer prepared by trimethylsilylating a hydrolyzed sodium silicate. MW=4000–6000. Hydroxy content is less than 0.5 weight percent on a solid basis.
[2]Tetraisopropyl titanate-parts by weight.
[3]Parts by weight.
[4]Adhesion of tape to steel panel in gm/in.
[5]Rubbed lightly 3 times in alternating directions with paper laboratory tissue prior to release force test.
[6]0.3 part by weight dibutyltin acetate (Syl-Off 23A) was employed.
[7]Dash (—) denotes not determined.

The use of tetralkyl titanate according to this invention not only permits the obtaining of somewhat higher release strength than obtained in runs 1-6 of table I hereof, but importantly also permits the use of a much smaller proportion of silicate-derived polymer without needing to replace all of the thus omitted polymer. Thus, the total additives of the principal polysiloxanes used has been substantially reduced. Of course, it is within the scope of the invention to use larger, or even smaller, amounts of the silicate-derived polymer.

The data in Table I are here viewed in at least 4 parts, i.e., runs 1-6, runs 7-11, runs 13-18 and runs 19-26.

Runs 1-6 were conducted without addition or use of the titanate of the invention.

Runs 7-11 were conducted with the titanate but did not use any silicate-derived polymer.

Runs 13-18 were conducted with a fixed, low amount, i.e., 2.5 parts by weight of the silicate-derived polymer and with low amounts, 0.12-1.00 parts by weight of the titanate.

Runs 19-26 include runs with less than 2.5 parts by weight of silicate-derived polymer, runs 19 and 26 as well as runs of considerably more than 2.5 parts by weight, but still less than that of run 6. Runs 19-26 show use of increasing amounts of titanate, i.e., 0.5-2.2.

Viewing the release forces given in column 5 it is seen that the use of the invention permits considerably lesser amounts of silicate-derived polymer to be used, without, however, needing to replace all of the omitted polymer.

Indeed, the use of the titanate, as described and shown in the table, yields considerably increased release forces.

Runs 13-18 which, according to the invention, show various release strengths which are all higher than that of run 1 made according to the prior art which did not use a titanate. Likewise, runs 21, 22 and either 23 or 24, which are, according to the invention, exhibiting significantly higher release strengths and comparable subsequent adhesion relative to runs made according to the prior art, i.e., runs 3, 4 and 5, respectively, made without a titanate. Runs 16 and 19, according to the invention, exhibit higher release strengths and subsequent adhesion than run 11 in which no silicate-derived polymer was used.

The rubbed release forces of the last column of table I for runs 1 and 11, according to the prior art, and runs 13-17, according to the invention, show approximately the same magnitude of increase over their respective original release forces, mainly approximately 2- to 3-fold increase.

The data in table III compared to runs 13-18 in table I shows that extended aging of the inventive coatings at room temperature did not significantly change the properties of the coatings, therefore coatings with an acceptable "shelf life" were obtained.

Table II

| Run No. | | Catalyst[1] | TIPT[2] | n-Octane[3] | Release Force | Subseq. Adhesion | Control Adhesion | Rubbed Release Force |
|---|---|---|---|---|---|---|---|---|
| 27 | (Comp.) | 1.0 | 0   | 57 | 37  | 483 | 628 | 85  |
| 28 | (Inv.)  | 1.0 | 0.1 | 58 | 80  | 573 | ″   | 107 |
| 29 | ″       | 1.0 | 0.2 | 59 | 273 | 427 | ″   | 317 |
| 30 | ″       | 1.0 | 0.3 | 60 | 317 | 337 | ″   | 467 |
| 31 | ″       | 1.0 | 0.4 | 61 | 293 | 350 | ″   | 647 |

Table II-continued

| Run No. | Catalyst[1] | TIPT[2] | n-Octane[3] | Release Force | Subseq. Adhesion | Control Adhesion | Rubbed Release Force |
|---|---|---|---|---|---|---|---|
| 32 | " | 1.0 | 0.5 | 62 | 303 | 300 | " | 523 |
| 33 | (Comp.) | 1.5 | 0 | 57 | 51 | 477 | 628 | 66 |
| 34 | (Inv.) | 1.5 | 0.1 | 58 | 107 | 547 | " | 164 |
| 35 | " | 1.5 | 0.2 | 59 | 145 | 467 | " | 200 |
| 36 | " | 1.5 | 0.3 | 60 | 270 | 423 | " | 480 |
| 37 | " | 1.5 | 0.4 | 61 | 283 | 303 | " | 453 |
| 38 | " | 1.5 | 0.5 | 62 | 208 | 237 | " | 460 |

[1] Dibutyltin diacetate (Syl-Off 23A) - Dow Corning Corp., parts by weight.
[2] Tetraisopropyl titanate, parts by weight.
[3] Parts by weight.

Table III

| Run No. | Silicate Derived Polymer | TIPT | n-Octane | Release Force | Subseq. Adhesion | Control Adhesion | Rubbed Release Force |
|---|---|---|---|---|---|---|---|
| 39 | 2.5 | 0.12 | 58.2 | 93 | 557 | 555 | 218 |
| 40 | 2.5 | 0.18 | 58.8 | 227 | 503 | " | 430 |
| 41 | 2.5 | 0.25 | 59.4 | 300 | 533 | " | 533 |
| 42 | 2.5 | 0.50 | 61.8 | 273 | 473 | " | 573 |
| 43 | 2.5 | 0.70 | 64.0 | 300 | 587 | " | 583 |
| 44 | 2.5 | 1.00 | 66.3 | 187 | 580 | " | 530 |

Reasonable variation and modification are possible within the scope of the foregoing disclosure and the appended claims to the invention the essence of which is that there have been combined effectively and significantly improved results a high molecular weight polymethyldihydroxysiloxane, a low molecular weight polymethylhydrosiloxane, a low molecular weight silicate-derived polymer and a tetraalkyl titanate to produce a composition well suited to application as a release coating or substrate, as described.

We claim:

1. A composition suitable for application as a release coating comprising a high molecular weight polymethyldihydroxysiloxane, a low molecular weight polymethylhydrosiloxane, a low molecular weight silicate-derived polymer and a tetraalkyl titanate wherein the high molecular weight polymethyldihydroxysiloxane can be represented by the general formula HO[Si(CH$_3$)$_2$O]$_n$H wherein n represents the number of repeating units in the polymer chain and is generally in the range of from about 1000 to about 5000; the low molecular weight polymethylhydrosiloxane can have a linear, cyclic or branched configuration and can be either a homopolymer or a copolymer in which

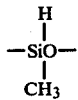

is from about 1 to about 10 percent by weight, based on the weight of the polymethyldihydroxysiloxane; the silicate-derived polymers have a molecular weight in the approximate range of from about 3000 to 10,000; and wherein a catalyst and an organic solvent are employed and wherein the ingredients are present in the approximate parts by weight:

| Polymethyldihydroxysiloxane | 3 |
|---|---|
| Polymethylhydrosiloxane | 0.03–0.3 |
| Silicate-derived polymer | .1–.5 |
| Tetraalkyl titanate | .05–2 |
| Catalyst | .01–.6 |
| Solvent | 20–200 |

2. A composition according to claim 1 wherein a catalyst and solvent are employed and wherein the ingredients are present in the approximate parts by weight:

| Polymethyldihydroxysiloxane | 3 |
|---|---|
| Polymethylhydrosiloxane | .06–.15 |
| Silicate-derived polymer | .2–.3 |
| Tetraalkyl titanate | .3–.7 |
| Catalysts | .1–.5 |
| Solvent | 50–80 |

3. A composition according to claim 1 wherein the tetraalkyl titanate is selected from tetramethyl titanate, tetraethyl titanate, tetraisopropyl titanate, tetra-n-butyl titanate, tetraoctyl titanate, tetradecyl titanate, tetradodecyl titanate.

4. A method for the preparation of a composition suitable as a release coating or substrate which comprises bringing together in a suitable organic solvent a polymethyldihydroxysiloxane, a polymethylhydrosiloxane, a silicate-derived polymer, a tetraalkyl titanate and a catalyst and agitating the mass thus obtained to homogenize the blend wherein the high molecular weight polymethyldihydroxysiloxane can be represented by the general formula HO[Si(CH$_3$)$_2$O]$_n$H wherein n represents the number of repeating units in the polymer chain and is generally in the range of from about 1000 to about 5000; the low molecular weight polymethylhydrosiloxane can have a linear, cyclic or branched configuration and can be either a homopolymer or a copolymer in which

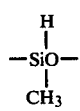

is from about 1 to about 10 percent by weight, based on the weight of the polymethyldihydroxysiloxane; the silicate-derived polymers have a molecular weight in the approximate range of from about 3000 to 10,000; and wherein the ingredients are present in the approximate parts by weight:

| | |
|---|---|
| Polymethyldihydroxysiloxane | 3 |
| Polymethylhydrosiloxane | 0.03–0.3 |
| Silicate-derived polymer | .1–.5 |
| Tetraalkyl titanate | .05–2 |
| Catalyst | .01–.6 |
| Solvent | 20–200 |

5. A method for preparing a well-retained, but readily removal protective coating for an adhesive coated substrate which comprises applying to a film to be applied to the adhesive to protect the same prior to application of said film, a composition according to claim 1.

* * * * *